United States Patent
Wang et al.

(10) Patent No.: US 11,925,906 B1
(45) Date of Patent: Mar. 12, 2024

(54) PREPARATION METHOD AND A DEVICE FOR A SEAWATER DESALINATION-SEAWATER EXTRACTION URANIUM MEMBRANE LINING

(71) Applicant: Harbin Engineering University, Harbin (CN)

(72) Inventors: Jun Wang, Harbin (CN); Bingtao Zhang, Harbin (CN); Hongsen Zhang, Harbin (CN); Qi Liu, Harbin (CN); Jing Yu, Harbin (CN); Jiahui Zhu, Harbin (CN); Jingyuan Liu, Harbin (CN); Rongrong Chen, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 18/380,211

(22) Filed: Oct. 16, 2023

(30) Foreign Application Priority Data

Oct. 14, 2022 (CN) .......................... 202211256450.8

(51) Int. Cl.
| | |
|---|---|
| *B01D 69/10* | (2006.01) |
| *B08B 3/08* | (2006.01) |
| *D02J 3/02* | (2006.01) |
| *D02J 3/14* | (2006.01) |
| *D06B 3/10* | (2006.01) |
| *D06B 3/34* | (2006.01) |

(52) U.S. Cl.
CPC ......... *B01D 69/105* (2013.01); *B01D 69/108* (2022.08); *B08B 3/08* (2013.01); *D02J 3/02* (2013.01); *D02J 3/14* (2013.01); *D06B 3/105* (2013.01); *D06B 3/345* (2013.01); *B01D 2323/081* (2022.08); *B01D 2323/12* (2013.01); *B01D 2323/42* (2013.01); *B01D 2325/54* (2022.08)

(58) Field of Classification Search
None
See application file for complete search history.

(56) References Cited

U.S. PATENT DOCUMENTS

2023/0381719 A1* 11/2023 Wang .................. B01D 69/108

FOREIGN PATENT DOCUMENTS

| CN | 106268361 A | 1/2017 |
|---|---|---|
| CN | 114931862 A | 8/2022 |

* cited by examiner

*Primary Examiner* — Krishnan S Menon
(74) *Attorney, Agent, or Firm* — Bayramoglu Law Offices LLC

(57) ABSTRACT

A preparation method and a device for a seawater desalination-seawater extraction uranium membrane lining are provided. The preparation method is as follow: the lining is configured as a finished product for standby through the following process, including cleaning, drying, restoration of circular, generating burrs, fixing the length of burrs; the device includes the first module, the second module, the third module, the fourth module and the fifth module. The present invention has the advantages of simple operation, short time, low cost and obvious treatment effect, the bonding strength between the separation function layer and the lining is enhanced, and the separation function layer is not easy to fall off, the physical damage resistance is greatly increased, it is not easy to fall off and the initial bubble point pressure of the prepared enhanced film is high.

10 Claims, 5 Drawing Sheets

PREPARATION METHOD AND A DEVICE FOR A SEAWATER DESALINATION-SEAWATER EXTRACTION URANIUM MEMBRANE LINING

CROSS REFERENCE TO THE RELATED APPLICATIONS

This application is based upon and claims priority to Chinese Patent Application No. 202211256450.8, filed on Oct. 14, 2022, the entire contents of which are incorporated herein by reference.

TECHNICAL FIELD

The present invention belongs to the field of polymer material preparation, and specifically relates to a preparation method and a device for a seawater desalination-seawater extraction uranium membrane lining.

BACKGROUND

Most of the Earth's surface is covered by water, accounting for 70.8% of the Earth's total area, and the area of surface water is 361 million square kilometers. However, although the total amount of water on the earth is very large, seawater accounts for 97%-98% of it, freshwater resources account for only 2.5% of the total water volume, and there is very little water resources that humans can use for life and production. The vast majority of freshwater resources exist in the poles, alpine glaciers and frozen snow, which are difficult to use, accounting for more than 85% of the total freshwater. The freshwater resources that can be used by human beings only account for 0.26% of the total water, which belongs to rivers, lakes and groundwater. At present, more than 180 countries in the world have the problem of water resources, about 1.5 billion people are in a state of water shortage, and more than 300 million people are seriously short of water. Therefore, the shortage of water resources is an urgent problem to be solved in the world.

Therefore, the conversion of seawater into fresh water can effectively alleviate the crisis of freshwater resources, and seawater desalination technology came into being. Seawater desalination refers to the process of dividing seawater into fresh water (removing excess salt and minerals from seawater) and brine concentrate (dissolved salt concentration is much higher than that of raw water). Due to the complex composition of seawater, the selection of appropriate pretreatment technology is conducive to reducing membrane fouling in the reverse osmosis process, reducing the number of membrane cleaning, prolonging the service life of the membrane, and further reducing the cost of water production.

Traditional pretreatment methods mainly include coagulation sedimentation, coagulation flotation and granular media filtration. Compared with the traditional pretreatment method, the water quality produced by membrane filtration method is better, better retention performance for algae cells and bacteria, therefore, it is more conducive to reducing the membrane fouling of the subsequent RO process and reducing the water production cost of the SWRO process.

Although the land uranium resources are limited, the ocean, a huge treasure trove of resources, provides us with a new way to obtain this resource. There are abundant uranium resources in seawater, and the total reserves are about 4.5 billion tons, which is more than one thousand times of land resources. The complex seawater environment is one of the biggest challenges in the development of efficient uranium adsorbents. Extracting uranium from seawater has high requirements on the strength of the material.

Fiber reinforced hollow fiber ultra-fine filtration membrane preparation technology, that is, introducing a woven or crocheted fiber tube (lining) inside the hollow fiber membrane as a support, using the woven or crocheted fiber tube to increase membrane strength, where the woven or crocheted fiber tube itself should have good chemical and thermal stability and good tensile strength, and this method maximizes the membrane strength while ensuring the membrane separation performance.

The existing reinforced membrane has a series of problems, such as easy peeling, rupture, low initial bubble point pressure, short service life and so on.

Problem 1: the lining and the separation of the liquid layer bonding is not strong, resulting in peeling, cracking. At present, there are two main types of linings for water treatment membranes: woven and crocheted. The lining and the separated material liquid layer belong to different polymer materials, and coating another polymer material on the surface of the formed polymer material, the force between the two polymer materials is weak, and the bonding between the two is not strong. The density of the woven lining hole is low, and the separation liquid layer is not easy to penetrate into the woven lining, the separated liquid layer staying on the surface of the woven lining is not firmly bonded to the lining, which leads to the peeling and cracking of the prepared reinforced membrane, which seriously affects the service life of the reinforced membrane.

Problem 2: there are long burrs in the lining, resulting in low initial bubble point pressure. Due to the burrs generated in the woven lining during the weaving process, the position of these burrs is not fixed and the number is not controllable, no rule to follow, too long burrs will penetrate the separated material liquid layer, resulting in the preparation of the reinforced membrane bubble point pressure is too low, seriously affecting the separation accuracy of the reinforced membrane. If finding a way to remove all the burrs on the surface of the woven lining, the surface of the woven lining is smooth, and the density of the holes in the woven lining is low, the separated liquid layer is not easy to penetrate into the woven lining, staying on the surface of the woven lining and being not firmly bonded to the lining, leading to the peeling and cracking of the prepared reinforced membrane, which seriously affects the service life of the reinforced membrane. For a crocheted lining, the density of its hole is high, and the coating of the separated material liquid layer is too thick, the separated material liquid is easy to penetrate into the crocheted lining, and it is easy to plug the inner hole of the crocheted lining, causing the reinforced membrane to become unusable; if the separated liquid layer is coated a little thin, unfixed overlong burrs on the surface of the crocheted lining can penetrate the separated material liquid layer, resulting in low initial bubble point pressure of the prepared reinforced membrane, which seriously affects the separation accuracy of the reinforced membrane and the product water quality. If finding a way to remove burrs of unfixed and uncontrollable in quantity on the surface of the crocheted lining, the surface of the crocheted lining becomes smooth, the force between the separated liquid layer and the crocheted lining is weak, leading to the easy peeling and rupture of the prepared reinforced membrane, which seriously affects the service life of the enhanced membrane.

The removal and non-removal of burrs on the surface of the lining are a pair of contradictions, removal is not, and non-removal is not. Therefore, how to solve the problem that the prepared reinforced membrane is easy to peel and rupture, increase the initial bubble point pressure and prolong the service life of the reinforced membrane is a technical problem.

SUMMARY

In view of the problems existing in the above existing technologies, the purpose of the present invention is to remove the additives in the lining and remove the overlong burrs on the surface of the lining surface, meanwhile, letting the lining grow burrs, so that the surface of the lining has a fixed length of burrs. The lining prepared by the present invention can maintain a moderate hardness in a circular state. The conception of the present invention includes the following two aspects:

1. washing additives off such as lubricating oil, anti-static agent and softener on the lining quickly by cleaning agent, meanwhile, protecting the lining from damage and it is easy to produce burrs, which creatively solves the problem of poor bonding between the lining and the separated material liquid layer.

When cleaning the additives such as lubricating oil, antistatic agent and softener on the lining, there are certain requirements for cleaning agent, cleaning agent concentration, temperature and cleaning time. When cleaning the lining, it is not possible to damage the existing burrs on the lining and surface, nor to form a membrane on the lining surface. Forming a layer of membrane on the surface of the lining, which will result in failure of subsequent a burr generating machine to produce burrs.

By adding sodium hydroxide, sodium carbonate, sodium dodecyl benzene sulfonate, sodium dodecyl sulfonate, commercially available detergent, etc., in the first cleaning tank and the second cleaning tank, an aqueous solution of any or its mixture is added, through the optimization of cleaning agent type, adding quantity, water temperature and residence time of lining in a rinse tank, thus, the lining can be cleaned quickly without damaging the lining.

Although cleaning the grease on the material with a chemical is a conventional method, how to quickly remove the oil without damaging the material itself is a technical problem. Because the chemical composition of different materials is different, the characteristics of different materials are different, and the materials used in the synthesis or preparation process are different, which leads to different difficulty in subsequent cleaning. According to the characteristics of the inner lining, the invention explores and selects the agent with small corrosion and good cleaning effect through a large number of experiments, by adjusting the concentration of the agent, the water temperature and the residence time of the lining in the rinse tank, removing the lubricating oil on the lining completely by two-step method, simultaneously, removing chemicals, antistatic agents and softeners from the lining through the first pure water tank, removing fully the residual on the lining through the second pure water tank. The used chemical concentration used should not be too high, if it is too high, the lining will be hydrolyzed, the lining strength will decrease, and the prepared separation membrane will have defects in the position where the hydrolysis is serious, resulting in the separation membrane being unable to use, if the used chemical concentration is too low, the cleaning is not thorough, not cleaning effect. The present invention uses a two-step method of cleaning with a high concentration of chemicals first and then with a low concentration of chemicals to thoroughly clean the lining. If the water temperature is too high, chemicals will destroy the lining, and if the water temperature is too low, the cleaning effect of chemicals will be poor. If the lining stays in the cleaning tank for too long, the lining will increase the chance of hydrolysis, thus destroying the lining; the residence time of the lining in the cleaning tank is too short, the action time of the agent and the lubricating oil is short, the cleaning is not complete, and the oil removal effect is poor.

2. Making the lining full of a fixed length of burrs and does not affect the mechanical strength of the lining, creatively solving the problem of low initial bubble point pressure of separation membrane caused by overlong burrs of the lining, simultaneously, solving the problem of poor bonding between the lining and the separated material liquid layer.

Making burrs all over the lining by means of a burr generating machine, controlling the burr length effectively according to the demand through a burr fixed length device, keeping the lining free of overlong burrs, enabling the preparation of separation membranes with a high initial bubble point pressure, high separation membrane separation precision and good separation effect, high separation accuracy of the separation membrane and good separation effect; the lining is full of fixed length burrs, the burrs are embedded in the separation function layer like nails, which leads to the enhancement of the bonding strength between the separation function layer and the lining, and the separation function layer is not easy to fall off.

The technical conception of the present invention is realized by the following technical schemes, and the present invention provides a preparation method and a device for a seawater desalination-seawater extraction uranium membrane lining, the preparation method is as follows: the lining will become a finished product for standby through the following process, including cleaning, drying, restoration of circular, generating burrs, fixing the length of burrs; the device includes: a first module, a second module, a third module, a fourth module, a fifth module, wherein the first module includes a first cleaning tank, a second cleaning tank, a first pure water tank, and a second pure water tank, the second module includes a drying oven, the third module includes a circular copper cylinder, the fourth module includes a burr generating machine, and the fifth module includes an elastic burr centralizer ring, a burr centralizer device, and a burr fixed length device. Specifically, the following steps includes:

Step 1: the first cleaning tank. Firstly, the lining enters the first cleaning tank, which has a length of 400 cm-1200 cm, a width of 5 cm-30 cm, and a height of 30 cm-100 cm, upper and lower two rows fixed pulleys are set in the first cleaning tank, and the number of the upper and lower two rows fixed pulleys is 1-6 respectively, a heating device is set in the first cleaning tank, a temperature of the heating device is controlled within 20° C.-60° C., a first circulating pump is set in the first cleaning tank, and a processing capacity of the first circulating pump is 0.5 $m^3$/h-2 $m^3$/h, the first circulating pump is controlled at 10 Hz-50 Hz by a frequency converter, the first circulating pump is connected with the upper and lower circulating pipes, and a predetermined number of holes are opened on the circulating pipe, downward holes are set on the upper circulating pipe, and the downward holes are opposite to the upper row fixed pulleys, upward holes, downward holes and both sideways downward-facing holes are set on the lower circulating pipe, the upward holes are opposite to the lower row fixed pulley, the both sideways downward-facing holes and the downward holes allow a circulating water to touch a wall of the first cleaning tank and then reverse a flow back, the first circulating pump makes a liquid in the first cleaning tank in a flowing state;

treatment process corresponding to Step 1: the treatment solution in the first cleaning tank is an aqueous solution of any or a mixture of sodium hydroxide, sodium carbonate, sodium dodecyl benzene sulfonate, sodium dodecyl sulfonate, commercially available detergent, etc.; a weight percentage of effective material content in the first cleaning tank is 0.5%-4%, the aqueous solution temperature is 20° C.-60° C., and the residence time is 70 s-480 s;

technical description: the length of the first cleaning tank is 400 cm-1200 cm, the width of the first cleaning tank is 5 cm-30 cm, the height of the first cleaning tank is 30 cm-100 cm, and two rows fixed pulleys are set in the tank, in order to increase the residence time of the lining in the tank, making the lining be cleaned more thoroughly; a heating device is set in the tank, a temperature of the heating device is controlled at 20° C.-60° C., which is to shorten the cleaning time of the lining and avoid damage to the lining; a liquid circulation pump is set to make the liquid in the tank mix evenly and fully ensure the contact between the cleaning agent and the lining; downward holes are set on the upper circulating pipe, and the holes are opposite to the upper row fixed pulley, upward holes, downward holes and both sideways downward-facing holes are set on the lower circulating pipe, the upward hole are opposite to the lower row fixed pulleys, which is to make the liquid in the tank fully flow, while allowing the cleaning agent to impact the lining can realize the purpose of cleaning the lining quickly.

The treatment solution in the tank is an aqueous solution of any or its mixture of sodium hydroxide, sodium carbonate, sodium dodecyl benzene sulfonate, sodium dodecyl sulfonate, and commercially available detergent, and its weight percentage is 0.5%-4%, the temperature of the aqueous solution is 20° C.-60° C., and the residence time is 70 s-480 s, one is to reduce the cost, the other is to quickly clean the lining without destroying the lining, and the third is to avoid the formation of a passivation film on the surface, which does not affect the subsequent generation of burrs in the lining.

Step 2: the second cleaning tank. The second cleaning tank is adjacent to the first cleaning tank, the distance between the second cleaning tank and the first cleaning tank is 0 cm-10 cm, 1-2 fixed pulleys are set between the second cleaning tank and the first cleaning tank, the second cleaning tank is basically the same as the first cleaning tank, the differences are that the length of the second cleaning tank is 600 cm-1200 cm, the width of the second cleaning tank is 5 cm-50 cm, and the height of the second cleaning tank is 20 cm-100 cm;

treatment process corresponding to Step 2: the treatment solution in the second cleaning tank is an aqueous solution of any or a mixture of sodium hydroxide, sodium carbonate, sodium dodecyl benzene sulfonate, sodium dodecyl sulfonate, commercial detergent, etc.; the weight percentage of the effective substance content in the second cleaning tank is 0.05%-1.5%, the temperature of the aqueous solution is 20° C.-60° C., and the residence time is 70 s-480 s;

technical description: the length of the second cleaning tank is 600 cm-1200 cm, the width of the second cleaning tank is 5 cm-50 cm, the height of the second cleaning tank is 20 cm-100 cm, and there are upper and lower two rows of fixed pulleys in the tank, in order to increase the residence time of the lining in the tank, making the lining can be cleaned more thoroughly.

The treatment solution in the tank is an aqueous solution of any or its mixture of sodium hydroxide, sodium carbonate, sodium dodecyl benzene sulfonate, sodium dodecyl sulfonate, and commercially available detergent, and its weight percentage is 0.05%-1.5%, the temperature of the aqueous solution is 20° C.-60° C., and the residence time is 70 s-480 s, one is to reduce the cost, the other is to quickly clean the remaining additives such as lubricating oil, antistatic agent and softener on the lining without destroying the lining, the third is to avoid the formation of a passivation film on the surface, which does not affect the subsequent generation of burrs in the lining.

Step 3: the first pure water tank. The first pure water tank is adjacent to the second cleaning tank, the distance between the first pure water tank and the second cleaning tank is 10 cm-50 cm, three fixed pulleys with different heights are set between the first pure water tank and the second cleaning tank, the first pure water tank is basically the same as the first cleaning tank device, the differences are that the length of the first pure water tank is 600 cm-1200 cm, the width of the first pure water tank is 10 cm-50 cm, and the height of the first pure water tank is 50 cm-100 cm;

treatment process corresponding to Step 3: the treatment liquid in the first pure water tank is pure water, the temperature of the first pure water tank is 20° C.-50° C., and the residence time is 70 s-480 s;

technical description: the length of the first pure water tank is 600 cm-1200 cm, the width of the first pure water tank is 10 cm-50 cm, the height of the first pure water tank is 50 cm-100 cm, and there are upper and lower two rows of fixed pulleys in the tank, which is to increase the residence time of the lining in the tank, making the lining can be cleaned more thoroughly.

The treatment solution in the tank is pure water, the temperature of the aqueous solution is 20° C.-50° C. and the residence time is 70 s-480 s, one is to clean the residual additives and cleaning solutions on the lining, the second is to avoid the formation of a passivation film on the surface, which does not affect the subsequent generation of burrs in the lining.

Step 4: the second pure water tank. The second pure water tank is adjacent to the first pure water tank, the distance between the second pure water tank and the first pure water tank is 0 cm-10 cm, 1-2 fixed pulleys are set between the second pure water tank and the first pure water tank, the second pure water tank is basically the same as the first cleaning tank device, the differences are that the length of the second pure water tank is 600 cm-1200 cm, the width of the second pure water tank is 10 cm-50 cm, and the height of the second pure water tank is 50 cm-100 cm;

treatment process corresponding to Step 4: the treatment liquid in the second pure water tank is pure water, the temperature of the aqueous solution in the second pure water tank is 20° C.-50° C., and the residence time is 70 s-480 s;

technical description: the length of the second pure water tank is 600 cm-1200 cm, the width the second pure water tank is 10 cm-50 cm, the height the second pure water tank is 50 cm-100 cm, and upper and lower two rows of fixed pulleys are set in the tank in order to increase the residence time of the lining in the tank, making the lining can be cleaned more thoroughly.

The treatment solution in the tank is pure water, the temperature of the aqueous solution is 20° C.-50° C., and the residence time is 70 s-480 s, which is to further quickly clean the residual additives and cleaning solution on the lining, which does not affect the subsequent generation of burrs in the lining.

Step 5: drying the moisture. A drying oven is adjacent to the second pure water tank, and the distance between the two is 5 cm-50 cm, two fixed pulleys with different heights are set between the drying oven and the second pure water tank, the length of the drying oven is 600 cm-2000 cm, the width of the drying oven is 5 cm-20 cm, and the height of the drying oven is 5 cm-20 cm, 1-6 fixed pulleys are set in the drying oven, a fixed pulley is set at the outlet of the drying oven 5 cm-10 cm, a heating device is set in the drying oven, and the temperature of heating device can be controlled in the range of 80° C.-120° C.;

treatment process corresponding to Step 5: the drying oven is used for drying moisture, the drying temperature is 80° C.-120° C., and the drying time is 180 s-600 s;

technical description: the length of the drying oven is 600 cm-2000 cm, the width the drying oven is 5 cm-20 cm, the height the drying oven is 5 cm-20 cm, 1-6 fixed pulleys are set in the drying oven to extend the drying time of the lining; a heating device is set in the drying oven, and the temperature of the heating device can be controlled within 80° C.-120° C., which is to dry the moisture of the lining and ensure the drying of the lining.

The drying time is set to 180 s-600 s, which is to ensure the dry condition of lining, avoiding the lining to be too hard to restore the circle subsequently.

Step 6: restoring to a circle shape. The inner diameter of the central circular hole of the circular copper cylinder is 0.5 mm-3 mm, the center of the central circular hole of the circular copper cylinder is in the same straight line as the outer edge of the fixed pulley at the outlet of the drying oven, the length of the circular copper cylinder is 5 cm-10 cm, the circular copper cylinder has a heating ring outside the body, and the temperature of the heating ring can be controlled at 165° C.-195° C.;

treatment process corresponding to Step 6: the method used to restore the lining to a circular shape is that the lining passes through a circular copper cylinder whose center is a central circular hole, the inner diameter of the central circular hole is 0.5 mm-3 mm, the length of the circular copper cylinder is 5 cm-10 cm, and the circular copper cylinder has a heating ring outside the circular copper cylinder. The temperature of the heating ring can be controlled at 165° C.-195° C.;

technical description: the inner diameter of the central circular hole of the circular copper cylinder is 0.5 mm-3 mm, and the length of the circular copper cylinder is 5 cm-10 cm, there is a heating ring outside the circular copper cylinder, and the temperature of the heating ring is set at 165° C.-195° C., which is to make the lining restore to a circular shape state, and to have a moderate hardness; if the temperature of the heating ring is too high, the lining will be too hard, and the prepared separated membrane is prone to defects, meanwhile it is unfavorable for the bonding between the separated material liquid layer and the separated membrane; if the temperature of the heating ring is too low, the lining will be softer, and the prepared separated membrane will be easy to be flat, resulting in the separated membrane cannot be kept a circle shape, which will affect the service life of the separated membrane.

Step 7: generating burrs. Setting a fixed pulley between a burr generating machine and the circular copper cylinder, fixing the outer edge of the fixed pulley on the same straight line with the center of the central circular hole at the outlet center of the circular copper cylinder, fixing the outer edge of fixed pulley on the same straight line with the center of the burr generating machine, the lining is on the fixed pulley, and the angle on both sides of the lining is 90°, after the lining is out of the circular copper cylinder, turning the lining to 90° by the fixed pulley and entering the burr generating machine, the burr generating machine is a hollow cylinder, the length of the burr generating machine is 10 cm-100 cm, connecting a motor with the burr generating machine, controlling the motor by a frequency converter, the frequency conversion is adjustable in the range of 20 Hz-50 Hz, setting a buffer spring area inside the hollow cylinder, setting 1-5 rows of burred nails on the buffer spring area, setting 3-36 burred nails each row, and the tip of the burred nail points to the center of the circle;

treatment process corresponding to Step 7: the lining enters into the burr generating machine, by controlling the rotational speed of the motor to drive the burred nails on the burr generating machine, the burr nails generate burrs on the surface of the lining, making the surface of the lining surface full of burrs;

technical description: the length of the burr generating machine is 10 cm-100 cm, connecting a motor with the burr generating machine, controlling the motor by a frequency converter, the frequency conversion is adjustable in the range of 20 Hz-50 Hz, setting a buffer spring area inside the hollow cylinder, setting 1-5 rows of burred nails on the buffer spring area, setting 3-36 burred nails each row, and the tip of the burred nail points to the center of the circle, which is to generate burrs on the lining surface, making the surface of the lining surface full of burrs.

Step 8: fixed length of burrs. The center of the burr fixed length device is in a straight line with the center of the burr generating machine, the burr fixed length device is a hollow cylinder, setting an elastic burr centralizer ring between the burr fixed length device and the burr generating machine, arranging a buffer spring area on the elastic burr centralizer ring, and setting a burr centralizer plate on the buffer spring area, after passing through the burr fixed length device, connecting to the burr centralizer device, uses a rotating wheel to drive the transmission track, setting the burr centralizer plate on the transmission track, the moving speed of the transmission track is faster than that of the lining, after passing through the burr centralizer, connected to the burr fixed length device, the length of the burr fixed length is 10 cm-100 cm, connecting a motor to the outside of the burr fixed length device, controlling the motor by a frequency converter, and the frequency conversion is adjustable within 20 Hz-50 Hz, setting 1-5 rows of shear knives inside the burr fixed length device, arranging 3-6 shear knives each row, the angle between the shear knives and the outer tangent line of the circle of the burr fixed length device in the rotation direction is 60°-88°;

treatment process corresponding to Step 8: treating the burrs on the surface of the lining by the burr fixed length device, using a shear knives to fix the length of the burr through high-speed rotary, and controlling the vertical burr length in 30 µm-100 µm;

technical description: the elastic burr centralizer ring and the burr centralizer device, which can right the inclined burrs of the surface of the lining, the length of the burr fixed length is 10 cm-100 cm, connecting the motor to the outside of the burr fixed length device, controlling the motor by a frequency converter, and the frequency conversion is adjustable within 20 Hz-50 Hz, setting 1-5 rows of shear knives inside the burr fixed length device, arranging 3-6 shear knives each row, the angle between the shear knives and the outer tangent line of the circle of the burr fixed length device in the rotation direction is 60°-88°, which is to ensure that the surface of the lining has a fixed length of burrs, no overlong burrs.

Beneficial effects: (1) The present invention has the advantages of simple operation, short time, low cost and obvious treatment effect, and can be applied to the lining used in the preparation of most linings such as the lining used in preparation of reinforced hollow fiber membranes. (2) The surface of the lining surface treated by the present invention has fixed length burrs, which is embedded in the separation function layer like a nail, the bonding strength between the separation function layer and the lining is enhanced, and the separation function layer is not easy to fall off. (3) The surface of the lining treated by the present invention has no overlong burrs, making the initial bubble point pressure of the prepared reinforced hollow fiber membranes high. (4) Compared with the ordinary lining, the lining of the present invention has a better surface adhesion performance, the surface of the separation functional layer is not easy to be damaged, and the physical damage resistance is greatly increased. (5) The lining of the present invention has no oily substance, and the lining is moderate in hardness.

DETAILED DESCRIPTION OF THE EMBODIMENTS

Figure 1:
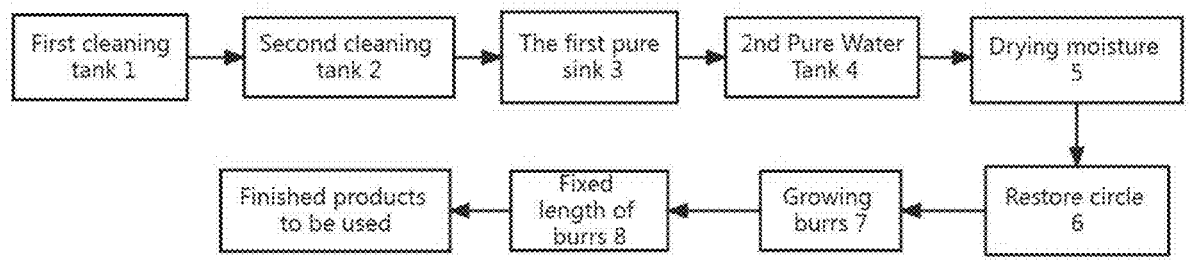
FIG. 1 is a process flow diagram.
Figure 2:
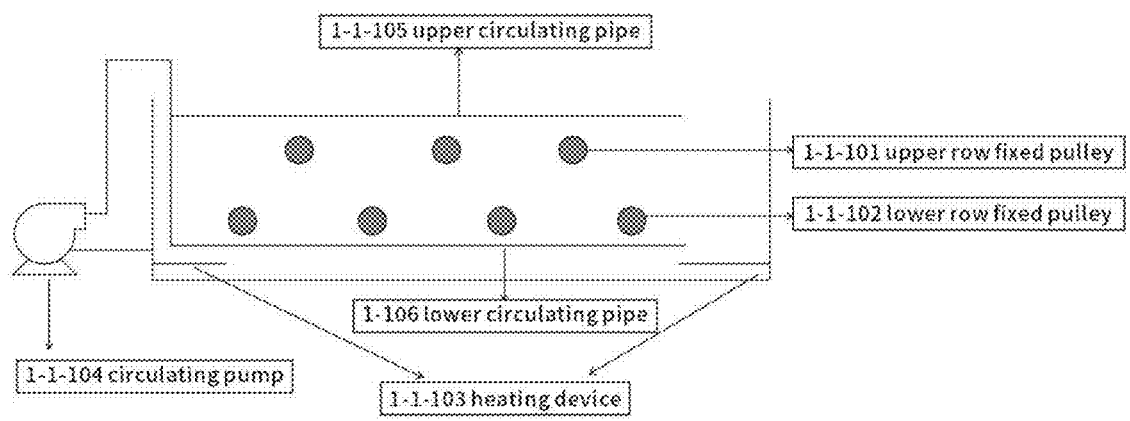
FIG. 2 is a schematic diagram of the first cleaning tank.
Figure 3:
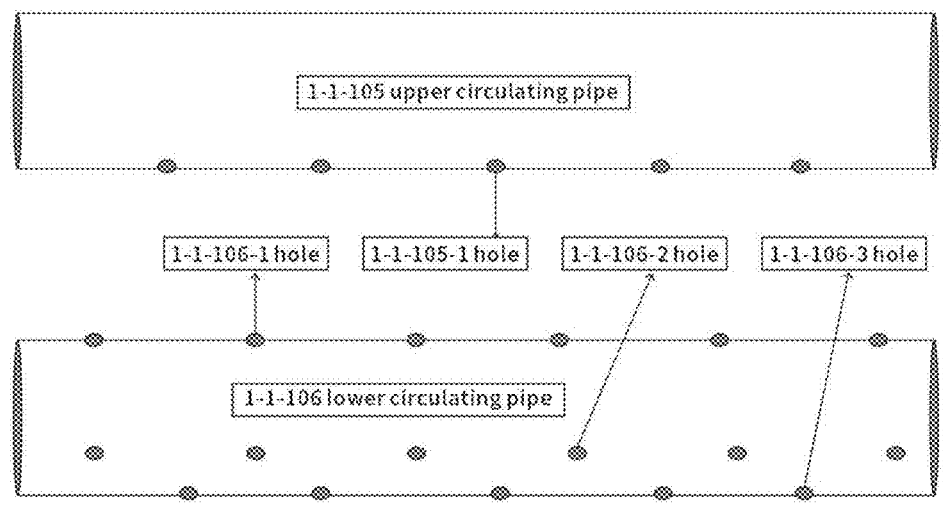
FIG. 3 is a schematic diagram of the upper and lower circulation pipes.
Figure 4:
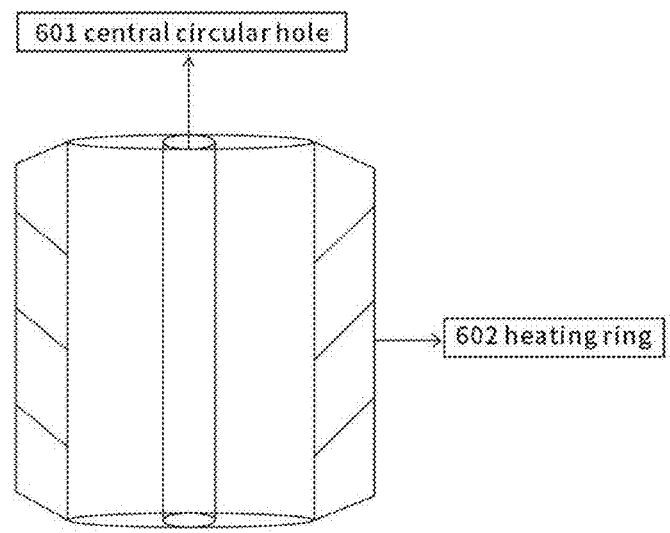
FIG. 4 is a schematic diagram of the circular copper cylinder.
Figure 5:
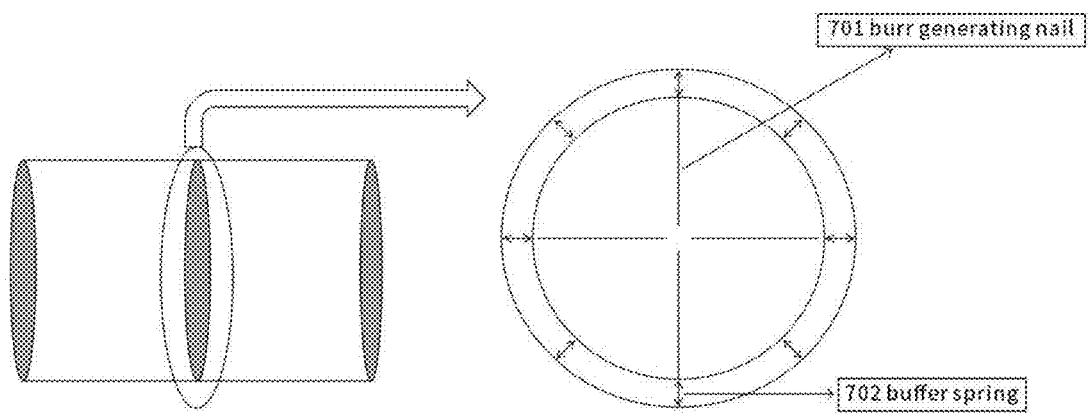
FIG. 5 is a schematic diagram of the burr generating machine.
Figure 6:
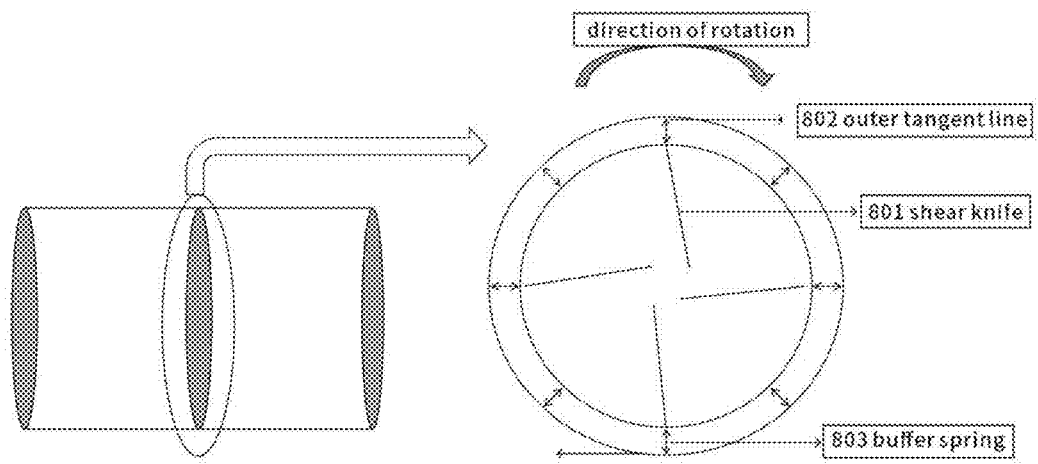
FIG. 6 is a schematic diagram of the burr fixed length device.
Figure 7:
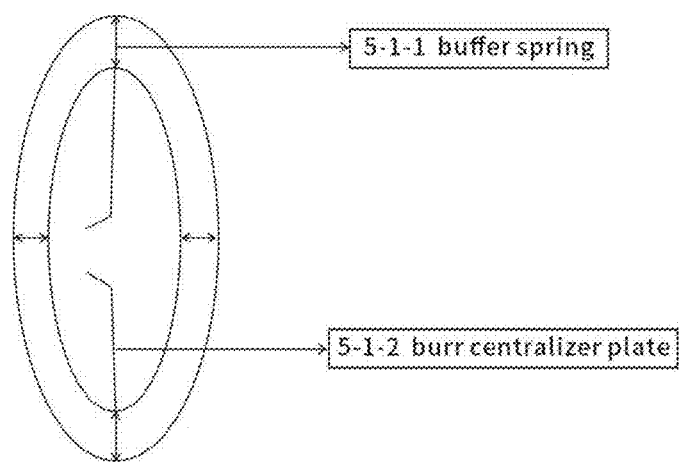
FIG. 7 is a schematic diagram of the elastic burr centralizer ring.
Figure 8:
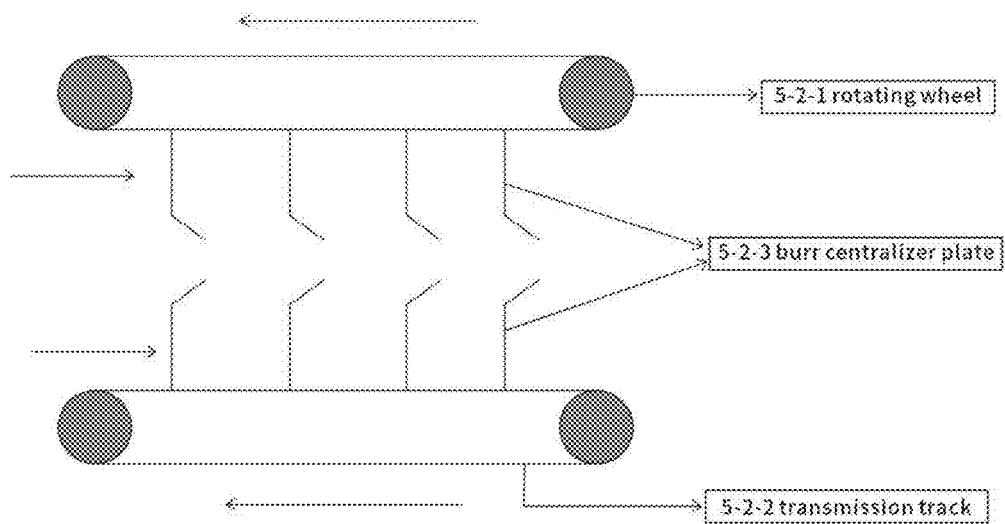
FIG. 8 is a schematic diagram of the burr centralizer device.
Figure 9:
FIG. 9 is a physical diagram of the lining.

The following is a detailed description of the present invention in combination with specific implementation examples. The following embodiments will help technicians in the field to further understand the present invention, but do not restrict the present invention in any way. It should be pointed out that for the ordinary technical personnel in this field, some deformations and improvements can be made without breaking away from the conception of the invention. These are all within the scope of protection of the present invention.

Example 1

A preparation method of seawater desalination-seawater extraction uranium membrane lining, which includes the following steps: Step 1: firstly the lining enters the first cleaning tank (1), wherein a liquid in the tank is sodium carbonate aqueous solution, the weight percentage of sodium carbonate content is 4%, a temperature is controlled at 50° C., and a residence time is 300 s; Step 2: the lining from the first cleaning tank (1) enters the second cleaning tank (2), wherein a liquid in the tank is sodium hydroxide aqueous solution, the weight percentage of sodium hydroxide content is 1%, a temperature is controlled at 35° C., and a residence time is 180 s; Step 3: the lining from the second cleaning tank (2) enters the first pure water tank (3), wherein a liquid in the tank is pure water, a temperature is controlled at 30° C., and a residence time is 300 s; Step 4: the lining from the first pure water tank (3) enters the second pure water tank (4), wherein a liquid in the tank is pure water, a temperature is controlled at 30° C., and a residence time is 360 s; Step 5: drying, the lining from the second pure water tank (4) enters the drying oven, wherein a temperature is controlled at 100° C., and a drying time is 540 s; Step 6: restoring a circle shape, the lining from the drying oven enters into a central circular hole (601) of the circular copper cylinder, wherein a temperature is controlled at 180° C.; Step 7: generating the burrs, and the lining from the central circular hole (601) of the circular copper cylinder enters the burr generating machine to generate burrs; Step 8: fixing the length of the burrs, shear knives (801) are used to fix the length of the burrs through high-speed rotary, wherein a vertical burr length is controlled at 50 µm.

The preparation method of seawater desalination-seawater extraction uranium membrane lining, which is realized by the following device, and The device consists of five modules connected in turn:

The first module: including a first cleaning tank (1), a second cleaning tank (2), a first pure water tank (3), a second pure water tank (4), the length of the first cleaning tank (1) is 1000 cm, the width of the first cleaning tank (1) is 10 cm, and the height of the first cleaning tank (1) is 100 cm, three upper row fixed pulleys (1-1-101) and four lower row fixed pulleys (1-1-102) are set in the first cleaning tank (1), a heating device (1-1-103) is set in the first cleaning tank (1), the temperature of the heating device (1-1-103) is controlled at 50° C., a first circulating pump (1-1-104) is set in the first cleaning tank, a processing capacity of the first circulating pump (1-1-104) is 1 m³/h, the first circulating pump (1-1-104) is controlled at 30 Hz by a frequency converter, the first circulating pump (1-1-104) is connected with the upper and lower circulating pipes, a certain number of holes are opened on the circulating pipe, downward holes (1-1-105-1) are set on the upper circulating pipe (1-1-105), and the downward holes (1-1-105-1) are opposite to the upper row fixed pulley (1-1-101), upward holes (1-1-106-1), downward holes (1-1-106-3) and both sideways downward-facing holes (1-1-106-2) are set on the lower circulating pipe (1-1-106), the upward holes (1-1-106-1) are opposite to the lower row fixed pulleys (1-1-102), both sideways downward-facing holes (1-1-106-2) and downward holes (1-1-106-3) allow the circulating water to touch the wall of the cleaning tank and then reverse the flow back, the first circulating pump (1-1-104) makes a liquid in the first cleaning tank in a flowing state; the second cleaning tank (2) is basically the same as the first cleaning tank device, differences are that a length of the second cleaning tank (2) is 600 cm, a width of the second cleaning tank is 10 cm, and a height of the second cleaning tank is 100 cm, a distance between the second cleaning tank (2) and the first cleaning tank (1) is 10 cm, and two fixed pulleys are set between the second cleaning tank (2) and the first cleaning tank (1), five upper row fixed pulleys (1-2-101) and six lower row fixed pulleys (1-2-102) are in the second cleaning tank (2), a heating device (1-2-103) is set in the second cleaning tank (2), a temperature of the heating device (1-2-103) is controlled at 35° C., a processing capacity of the second circulating pump (1-2-104) is 2 m³/h, the second circulating pump (1-2-104) is controlled at 45 Hz by a frequency converter, the second circulating pump (1-2-104) keeps the sodium hydroxide aqueous solution in the tank in a flowing state; the device of the first pure water tank (3) is basically the same as that of the first cleaning tank (1), the differences are that a length of the first pure water tank (3) is 1000 cm, a width of the first pure water tank (3) is 30 cm, and a height is of the first pure water tank (3) 50 cm, an adjacent distance between the first pure water tank (3) and the second cleaning tank (2) is 10 cm, three fixed pulleys with different heights are set between the first pure water tank (3) and the second cleaning tank (2), two upper row fixed pulleys (1-3-101) and three lower row fixed pulleys (1-3-102) are set in the first pure water tank (3), a heating device (1-3-103) is set in the first pure water tank (3), a temperature of the heating device (1-3-103) is controlled at 30° C., the third circulating pump (1-3-104) is controlled at 35 Hz by a frequency converter, the third circulating pump (1-3-104) makes the liquid pure water in the tank in a flowing state; the device of the second pure water tank (4) is basically the same as the first cleaning tank (1), the differences are that a length of the second pure water tank (4) is 1200 cm, a width of the second pure water tank (4) is 50 cm, and a height of the second pure water tank (4) is 50 cm, an adjacent distance between the first pure water tank (3) and the second pure water tank (4) is 5 cm, a fixed pulley between the first pure water tank (3) and the second pure water tank (4), an upper row fixed pulley (1-4-101) and two lower row fixed pulleys (1-4-102) are set in the second pure water tank (4), a heating device (1-4-103) is set in the second pure water tank (4), a temperature of the heating device (1-4-103) is controlled at 30° C., a processing capacity of the fourth circulating pump (1-4-104) is 0.5 m³/h, the fourth circulating pump (1-4-104) is controlled at 50 Hz by a frequency converter, and the fourth circulating pump (1-4-104) makes the liquid pure water in the tank in a flowing state.

The second module: including a drying oven, a length of the drying oven is 1800 cm, a width of the drying oven is 5 cm, and a height of the drying oven is 5 cm, a distance between the second pure water tank (4) and the drying oven is 50 cm, two fixed pulleys with different heights are set between them, six fixed pulleys are set in the drying oven, a fixed pulley is set at 5 cm from the outlet of the drying oven, and a heating device is set in the drying oven.

The third module: including a circular copper cylinder, the inner diameter of the central circular hole (601) of the circular copper cylinder is 2 mm, the central circular hole (601) of the circular copper cylinder is in the same straight line as the outer edge of the fixed pulley at the outlet of the drying oven, the length of the circular copper cylinder is 8 cm, and the outside of the circular copper cylinder has a heating ring (602).

The fourth module: including a burr generating machine, setting a fixed pulley between the burr generating machine and the circular copper cylinder, the outer edge of the fixed pulley is in the same straight line as the central circular hole (601) at the outlet of the circular copper cylinder, the outer edge of the fixed pulley is in a straight line with the center of the burr generating machine, the inner lining between the circular copper cylinder and the burr generating machine is at a 900 angle at the fixed pulley position, the burr generating machine is a hollow cylinder, the length of the burr device is 100 cm. connecting the burr generating machine to a motor, and controlling the motor at 20 Hz by a frequency converter, setting three rows of burr generating nails (701) inside the hollow cylinder, each row has 12 burr generating nails (701), and the tip of the burr generating nails (701) points to the center of the circle.

The fifth module: including an elastic burr centralizer device, a burr centralizer device, and a burr fixed length device, the center of the burr fixed length device is in a straight line with the center of the burr generating machine, the burr fixed length device is a hollow cylinder, setting an elastic burr centralizer ring between the burr fixed length device and the burr generating machine, arranging a buffer spring (5-1-1) area on the elastic burr centralizer ring, and setting a burr centralizer plate (5-1-2) on the buffer spring (5-1-1) area, after passing through the burr fixed length device, connecting to the burr centralizer device, uses a rotating wheel (5-2-1) to drive the transmission track (5-2-2), setting the burr centralizer plate on the transmission track, the moving speed of the transmission track is faster than that of the lining, after passing through the burr centralizer, connected to the burr fixed length device, the length of the burr fixed length is 10 cm-100 cm, connecting a motor to the outside of the burr fixed length device, controlling the motor by a frequency converter, and the frequency conversion is adjustable within 45 Hz, setting 3 rows of shear knives (801) and buffer springs (803) inside the burr fixed length device, arranging 3 shear knives each row, the angle between the shear knives (801) and the outer tangent line (802) of the circle of the burr fixed length device in the rotation direction is 80°.

The initial bubble point pressure of the seawater desalination-seawater uranium extraction membrane prepared by the untreated lining is 0.08 MPa, and the burst strength is 0.45 Mpa; however, treating a seawater desalination-seawater extraction uranium membrane lining prepared by the lining of example 1, the initial bubble point pressure is 0.2 Mpa, and the burst strength is 0.68 Mpa, the effect is obviously better than that of untreated lining.

Example 2

This example is basically the same as the preparation method of a seawater desalination-seawater extraction uranium membrane lining described in example 1, and the differences are: Step 1: the treatment liquid in the first cleaning tank (1) is a mixed liquid of sodium dodecyl sulfate with a weight percentage of 1% and sodium hydroxide with a weight percentage of 1.5%; Step 2: the treatment solution in the second cleaning tank (2) is sodium carbonate aqueous solution with a weight percentage of 1%.

This example is basically the same as the preparation device of a seawater desalination-seawater extraction uranium membrane lining described in example 1, and the differences are: the length of the circular copper cylinder in the restoring circular shape device of the third module is 10 cm, the outside of the circular copper cylinder has a heating ring (602), and controlling the temperature of the heating ring (602) at 165° C., the angle between the shear knives (801) of the fifth module and the outer tangent line (802) of the circle of the burr fixed length device in the rotation direction is 75°, using the shear knives (801) to fix the length of the burrs through high-speed rotary, and controlling the vertical burr length at 70 μm.

The initial bubble point pressure of a seawater desalination-seawater uranium extraction membrane prepared by untreated lining is 0.07 MPa, and the burst strength is 0.46 Mpa; however, treating a seawater desalination-seawater extraction uranium membrane lining prepared by the lining of example 2, the initial bubble point pressure is 0.19 Mpa, and the burst strength is 0.61 Mpa, the effect is obviously better than that of untreated lining.

Example 3

This example is basically the same as the preparation method of a seawater desalination-seawater extraction uranium membrane lining described in example 1, and the differences are: Step 1: the treatment liquid in the first cleaning tank (1) is commercially available detergent with a weight percentage of 2%, and the residence time is 480 s; Step 2: the treatment solution in the second cleaning tank (2) is sodium dodecyl benzene sulfonate with a weight ratio of 1.5%, and the residence time is 360 s.

This example is basically the same as the preparation device of a seawater desalination-seawater extraction uranium membrane lining described in example 1, and the differences are: the angle between the shear knives (801) of the fifth module and the outer tangent line (802) of the burr length device in the rotation direction is 88°, using the shear knives (801) to fix the length of the burrs through high-speed rotary, and controlling the vertical burr length at 30 μm.

The initial bubble point pressure of a seawater desalination-seawater uranium extraction membrane prepared by untreated lining is 0.07 MPa, and the burst strength is 0.46 Mpa; however, treating a seawater desalination-seawater extraction uranium membrane lining prepared by the lining of example 3, the initial bubble point pressure is 0.32 Mpa, and the burst strength is 0.74 Mpa, the effect is obviously better than that of untreated lining.

Example 4

This example is basically the same as the preparation device of a seawater desalination-seawater extraction uranium membrane lining described in example 3, and the differences are: the length of the circular copper cylinder of the third module is 10 cm, the outside of the circular copper cylinder has a heating ring (602), and controlling the temperature of the heating ring (602) at 175° C.

The initial bubble point pressure of a seawater desalination-seawater uranium extraction membrane prepared by untreated lining is 0.07 Mpa, and the burst strength is 0.46 Mpa; however, treating a seawater desalination-seawater extraction uranium membrane lining prepared by the lining of example 4, the initial bubble point pressure is 0.31 Mpa, and the burst strength is 0.71 Mpa, the effect is obviously better than that of untreated lining.

Example 5

This example is basically the same as the preparation device of a seawater desalination-seawater extraction uranium membrane lining described in example 4, and the differences are: setting 5 rows of burr generating nails (701) in the hollow cylinder of the burr fixed length device in the fourth module, setting 8 burr generating nails each row, and the nail tips of burr generating nails (701) all point to the center of the circle.

The initial bubble point pressure of a seawater desalination-seawater uranium extraction membrane prepared by untreated lining is 0.07 Mpa, and the burst strength is 0.46 Mpa; however, treating a seawater desalination-seawater extraction uranium membrane lining prepared by the lining of example 5, the initial bubble point pressure is 0.38 Mpa, and the burst strength is 0.82 Mpa, the effect is obviously better than that of untreated lining.

Example 6

This example is basically the same as the preparation device of a seawater desalination-seawater extraction uranium membrane lining described in example 5, and the differences are: 5 rows of shear knives (801) are set in the burr fixed length device of the fifth module, and 6 shear knives (801) are set each row.

The initial bubble point pressure of a seawater desalination-seawater uranium extraction membrane prepared by untreated lining is 0.07 Mpa, and the burst strength is 0.46 Mpa; however, treating a seawater desalination-seawater extraction uranium membrane lining prepared by the lining of example 6, the initial bubble point pressure is 0.39 Mpa, and the burst strength is 0.79 Mpa, the effect is obviously better than that of untreated lining.

Example 7

This example is basically the same as the preparation method of a seawater desalination-seawater extraction uranium membrane lining described in example 1, and the differences are: Step 1: the treatment liquid in the first cleaning tank (1) is a commercially available detergent with a weight percentage of 1.5% and a sodium hydroxide mixed liquid with a weight percentage of 1%; Step 2: the treatment solution in the second cleaning tank (2) is a mixed solution of sodium carbonate with a weight percentage of 0.5% and a commercially available detergent with a weight percentage of 0.5%.

This example is basically the same as the preparation device of a seawater desalination-seawater extraction uranium membrane lining described in example 3, and the differences are: the length of the circular copper cylinder of the third module is 5 cm, the outside of the circular copper cylinder has a heating ring (602), and controlling the temperature of the heating ring (602) at 195° C., the angle between the shear knives (801) of the fifth module and the outer tangent line (802) of the burr fixed length device in the rotation direction is 60°, using the shear knife (801) to fix the length of the burr through high-speed rotary, and controlling the vertical burr length at 100 μm.

The initial bubble point pressure of a seawater desalination-seawater uranium extraction membrane prepared by untreated lining is 0.08 MPa, and the burst strength is 0.43 MPa; however, treating a seawater desalination-seawater extraction uranium membrane lining prepared by the lining of example 7, the initial bubble point pressure is 0.17 MPa, and the burst strength is 0.58 MPa, the effect is obviously better than that of untreated lining.

What is claimed is:

1. A preparation device of a seawater desalination-seawater extraction uranium membrane lining, wherein the preparation device comprises five modules connected in turn:

a first module: comprising a first cleaning tank, a second cleaning tank, a first pure water tank, a second pure water tank, wherein a length of the first cleaning tank is 1000 cm, a width of the first cleaning tank is 10 cm, and a height of the first cleaning tank is 100 cm, three upper row fixed pulleys and four lower row fixed pulleys are set in the first cleaning tank, a heating device is set in the first cleaning tank, a temperature of the heating device is controlled at 50° C., a first circulating pump is set in the first cleaning tank, a processing capacity of the first circulating pump is 1 m$^3$/h, the first circulating pump is controlled at 30 Hz by a frequency converter, the first circulating pump is connected with an upper circulating pipe and a lower circulating pipe, and a predetermined number of holes are opened on the upper circulating pipe and the lower circulating pipe, downward holes are set on the upper circulating pipe, and the downward holes are opposite to the three upper row fixed pulleys, upward holes, downward holes and both sideways downward-facing holes are set on the lower circulating pipe, the upward holes are opposite to the four lower row fixed pulleys, the both sideways downward-facing holes and the downward holes allow a circulating water to touch a wall of the first cleaning tank and then reverse a flow back, the first circulating pump makes a liquid in the first cleaning tank in a flowing state; devices of the second cleaning tank are basically the same as devices of the first cleaning tank, differences between the second cleaning tank and the first cleaning tank comprise a length of the second cleaning tank is 600 cm, a width of the second cleaning tank is 10 cm, and a height of the second cleaning tank is 100 cm, a distance between the second cleaning tank and the first cleaning tank is 10 cm, and two fixed pulleys are set between the second cleaning tank and the first cleaning tank, five upper row fixed pulleys and six lower row fixed pulleys are in the second cleaning tank, a heating device is set in the second cleaning tank, the temperature of the heating device is controlled at 35° C., a processing capacity of a second circulating pump is 2 m$^3$/h, the second circulating pump is controlled at 45 Hz by a frequency converter, the second circulating pump keeps a liquid in the second cleaning tank in a flowing state; devices of the first pure water tank is basically the same as the device of the first cleaning tank, differences between the first pure water tank and the first cleaning tank comprise a length of the first pure water tank is 1000 cm, a width of the first pure water tank is 30 cm, and a height is of the first pure water tank 50 cm, an adjacent distance between the first pure water tank and the second cleaning tank is 10 cm, three fixed pulleys with different heights are set between the first pure water tank and the second cleaning tank, two upper row fixed pulleys and three lower row fixed pulleys are set in the first pure water tank, a heating device is set in the first pure water tank, a temperature of the heating device is controlled at 30° C., a third circulating pump is controlled at 35 Hz by a frequency converter, the third circulating pump makes a liquid pure water in the first pure water tank in a flowing state; devices of the second pure water tank are basically the same as the devices of the first cleaning tank, differences between the second pure water tank and the first cleaning tank comprise the length of the second pure water tank is 1200 cm, a width of the second pure water tank is 50 cm, and a height of the second pure water tank is 50 cm, an adjacent distance between the first pure water tank and the second pure water tank is 5 cm, a fixed pulley is set between the first pure water tank and the second pure water tank, an upper row fixed pulley and two lower row fixed pulleys are set in the second pure water tank, a heating device is set in the second pure water tank, a temperature of the heating device is controlled at 30° C., a processing capacity of a fourth circulating pump is 0.5 m$^3$/h, the fourth circulating pump is controlled at 50 Hz by a frequency converter, and the fourth circulating pump makes a liquid pure water in the second pure water tank in a flowing state;

a second module: comprising a drying oven, wherein a length of the drying oven is 1800 cm, a width of the drying oven is 5 cm, and a height of the drying oven is 5 cm, an adjacent distance between the second pure water tank and the drying oven is 50 cm, two fixed pulleys with different heights are set between the second pure water tank and the drying oven, six fixed pulleys are set in the drying oven, a fixed pulley is set at 5 cm from an outlet of the drying oven, and a heating device is set in the drying oven;

a third module: comprising a circular copper cylinder, an inner diameter of a central circular hole of the circular copper cylinder is 0.5 mm-3 mm, a center of the central circular hole of the circular copper cylinder is in a same straight line as an outer edge of the fixed pulley at the outlet of the drying oven, a length of the circular copper cylinder is 5 cm-10 cm, and an outside of the circular copper cylinder has a heating ring;

a fourth module: comprising a burr generating machine, a fixed pulley is set between the burr generating machine and the circular copper cylinder, an outer edge of the fixed pulley is in a same straight line as the center of the central circular hole at an outlet of the circular copper cylinder, the outer edge of the fixed pulley is in a straight line with a center of the burr generating machine, a lining between the circular copper cylinder and the burr generating machine is at a 90° angle at a position of the fixed pulley, the burr generating machine is a hollow cylinder, a length of a burr generating machine is 10 cm-100 cm, an outside of the burr generating machine is connected to a motor, and the motor is controlled at 20 Hz-50 Hz by a frequency converter, 1-5 rows of burr generating nails are set inside the hollow cylinder, each row of the burr generating nails has 3-36 burr generating nails, and tips of the burr generating nails point to a center of a circle;

a fifth module; comprising an elastic burr centralizer device, a burr centralizer device, and a burr fixed length device, a center of the burr fixed length device is in a straight line with the center of the burr generating machine, the burr fixed length device is a hollow cylinder, an elastic burr centralizer ring is set between the burr fixed length device and the burr generating machine, a buffer spring area is set on the elastic burr centralizer ring, and a burr centralizer plate is set on the buffer spring area, the burr centralizer device is connected behind the burr fixed length device, the burr centralizer device uses a rotating wheel to drive a transmission track, a burr centralizer plate is set on the transmission track, a moving speed of the transmission track is faster than a moving speed of the lining, the burr fixed length device is connected behind the burr centralizer, a length of the burr fixed length is 10 cm-100 cm, a motor is connected to an outside of the burr fixed length device, the motor is controlled by a frequency converter at 20 Hz-50 Hz, 1-5 rows of shear knives and buffer springs are set inside the burr fixed length device, 3-6 shear knives are arranged each row of the shear knives, an angle between the shear knives and an outer tangent line of a circle of the burr fixed length device in a rotation direction is 60°-88°.

2. The preparation device of the seawater desalination-seawater extraction uranium membrane lining according to claim 1, wherein the length of the circular copper cylinder in a restoring circular shape device of the third module is 10 cm, the outside of the circular copper column has a heating ring; the angle between the shear knives of the fifth module and the outer tangent line of the circle of the burr fixed length device in the rotation direction is 75°, and a length of burrs are fixed by the shear knives through a high-speed rotary.

3. The preparation device of the seawater desalination-seawater extraction uranium membrane lining according to claim 1, wherein the angle between the shear knives of the fifth module and the outer tangent line of the burr length device in the rotation direction is 88°, and a length of burrs are fixed by the shear knives through a high-speed rotary.

4. The preparation device of the seawater desalination-seawater extraction uranium membrane lining according to claim 3, wherein the length of the circular copper cylinder of the third module is 10 cm, the outside of the circular copper column has a heating ring; 5 rows of burr generating nails are set in the hollow cylinder of the burr generating machine in the fourth module, 8 burr generating nails are set each row, and the nail tips of burr generating nails all point to the center of the circle; 5 rows of shear knives are set in the burr fixed length device of the fifth module, and 6 shear knives are set each row of the burr generating nails.

5. The preparation device of the seawater desalination-seawater extraction uranium membrane lining according to claim 1, wherein the length of the circular copper cylinder of the third module is 5 cm, the outside of the circular copper column has a heating ring; the angle between the shear knives of the fifth module and the outer tangent line of the burr fixed length device in the rotation direction is 60°, and a length of burrs are fixed by the shear knives through a high-speed rotary.

6. A preparation method of a seawater desalination-seawater extraction uranium membrane lining using the preparation device of the seawater desalination-seawater extraction uranium membrane lining according to claim 1 to prepare the seawater desalination-seawater extraction a uranium membrane lining, comprising the following steps: step 1: firstly the lining enters the first cleaning tank, wherein a temperature of a liquid A in the tank is controlled at 50° C., and a residence time is 300 s; step 2: the lining from the first cleaning tank enters the second cleaning tank, wherein a temperature of a liquid B in the tank is controlled at 35° C., and a residence time is 180 s; step 3: the lining from the second cleaning tank enters the first pure water tank, wherein a liquid in the tank is a pure water, a temperature is controlled at 30° C., and a residence time is 300 s; step 4: the lining from the first pure water tank enters the second pure water tank, wherein a liquid in the tank is a pure water, a temperature is controlled at 30° C., and a residence time is 360 s; step 5: drying, the lining from the second pure water tank enters the drying oven, wherein a temperature is controlled at 100° C., and a drying time is 540 s; step 6: restoring a circle shape, the lining from the drying oven enters into the central circular hole of the circular copper cylinder, a temperature is controlled at 165-195° C.; step 7: generating burrs, the lining from the central circular hole of the circular copper cylinder enters the burr generating machine for generating the burrs; step 8: fixing a length of the burrs, shear knives are used to fix the length of the burrs through a high-speed rotary, and a vertical burr length is controlled at 30-100 μm.

7. The preparation method of the seawater desalination-seawater extraction uranium membrane lining according to claim 6, wherein the liquid A described in step 1 is 4% sodium carbonate solution in percentage by weight; the liquid B described in step 2 is 1% sodium hydroxide solution in percentage by weight; the temperature in step 6 is controlled at 180° C.; and the vertical burr length in step 8 is controlled at 50 μm.

8. The preparation method of the seawater desalination-seawater extraction uranium membrane lining according to claim 6, wherein the liquid A described in step 1 is a mixed solution of 1% sodium dodecyl sulfate in percentage by weight and 1.5% sodium hydroxide in percentage by weight, the liquid B described in step 2 is 1% sodium carbonate solution in percentage by weight; controlling the temperature in step 6 at 165° C., controlling the vertical burr length described in step 8 at 70 μm.

9. The preparation method of the seawater desalination-seawater extraction uranium membrane lining according to claim 6, wherein the liquid A described in step 1 is 2% commercial detergent solution in percentage by weight; the liquid B described in step 2 is 1.5% sodium dodecyl benzene sulfonate solution in percentage by weight; the temperature in step 6 is controlled at 180° C., and the vertical burr length described in step 8 is controlled at 30 μm.

10. The preparation method of the seawater desalination-seawater extraction uranium membrane lining according to claim 6, wherein the liquid A described in step 1 is a mixed solution of 1.5% commercial detergent in percentage by weight and 1% sodium hydroxide in percentage by weight; the liquid B described in step 2 is a mixed solution of 0.5% sodium carbonate in percentage by weight and 0.5% commercial detergent in percentage by weight, the temperature in step 6 is controlled at 195° C., and the vertical burr length described in step 8 is controlled at 100 μm.

* * * * *